Dec. 28, 1943.　　　C. E. MONGAN, JR　　　2,338,071
APPARATUS FOR TEMPERING GLASS BOTTLES AND LIKE ARTICLES
Filed May 22, 1941
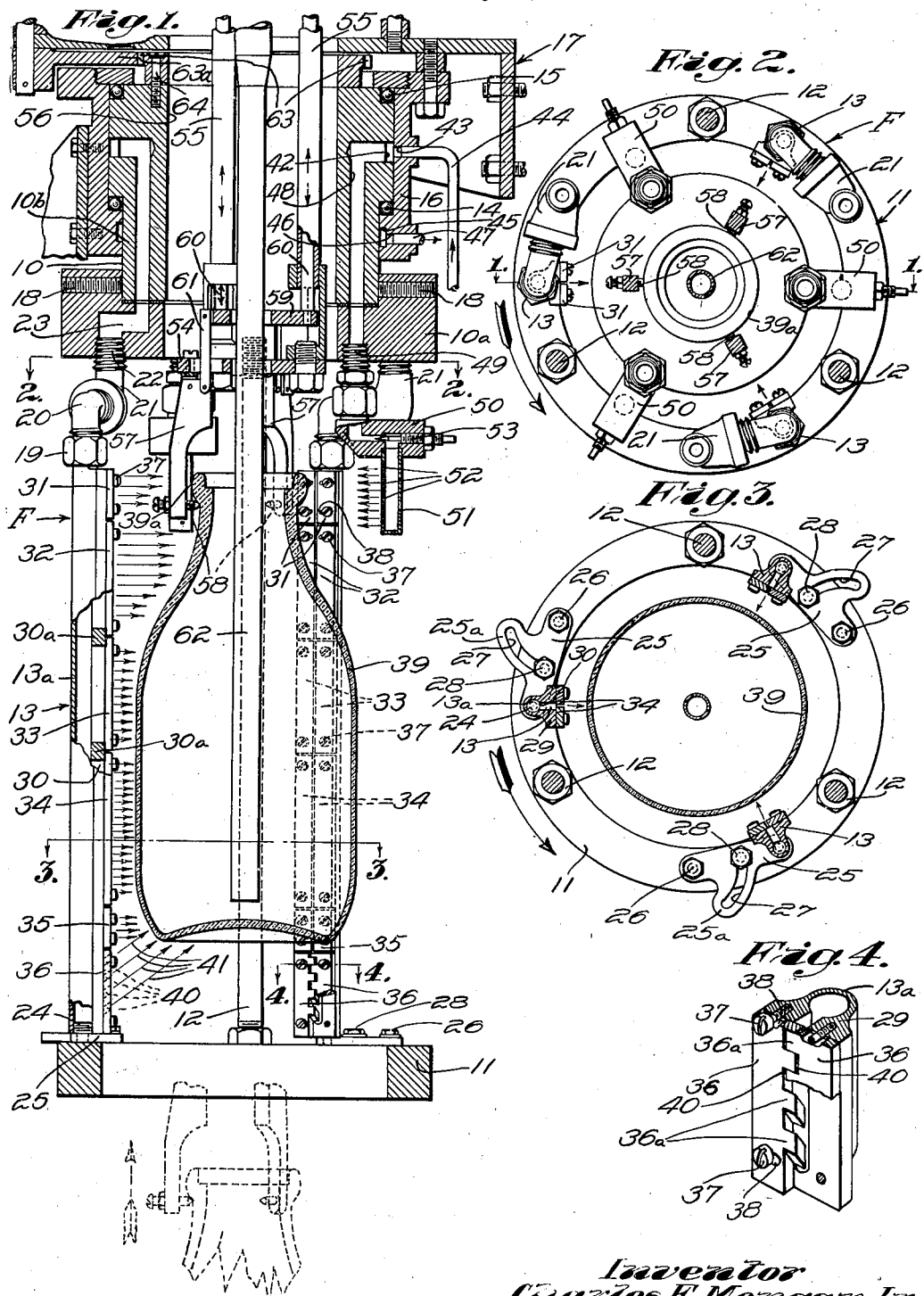
Witness
W. B. Thayer
Inventor
Charles E. Mongan Jr.
by Brown & Parham
Attorneys Patented Dec. 28, 1943

2,338,071

UNITED STATES PATENT OFFICE 2,338,071

APPARATUS FOR TEMPERING GLASS BOTTLES AND LIKE ARTICLES

Charles E. Mongan, Jr., Hartford, Conn., assignor to Hartford-Empire Company, Hartford, Conn., a corporation of Delaware Application May 22, 1941, Serial No. 394,599

14 Claims. (Cl. 49—45)

This invention relates to improvements in apparatus for applying cooling fluid to glass bottles, jars, and other hollow glass articles, especially to effect tempering thereof.

An object of the invention is to provide a means for applying cooling fluid to the exterior of a hollow glass article which will afford better facilities than heretofore for effecting regulable control of the application of the cooling fluid to the external surface of the article at various places along the length thereof.

A further object of the invention is to provide in a tempering apparatus of the character described a novel blowing frame within which a bottle or like article may be supported in position to be subjected to cooling fluid applied by the cooling frame to the entire external lateral and bottom surfaces of such article.

A further object of the invention is to provide in a glass tempering apparatus of the character described a novel blowing frame which includes one or more elongate substantially vertical cooling fluid discharge units extending substantially parallel with the longitudinal axis of a glass article to be tempered and adapted for part of its length to discharge cooling fluid in a substantially horizontal direction against the lateral external surface of the article and for a further part of its length to discharge cooling fluid in an inclined direction against the external bottom surface of the article.

A further object of the invention is to provide in a tempering apparatus of the character described a novel blowing frame having a plurality of elongate substantially vertical cooling fluid discharge units respectively located at spaced points in a circle about an axis approximately coincident with the axis of the glass article to be cooled, together with movable means for engaging the article to be cooled at a level below the frame and for moving such article vertically to a higher position within the frame at which such article may be cooled by cooling fluid from the discharge units of the frame.

A further object of the invention is the provision in tempering apparatus of the character described of a novel rotary open-bottomed blowing frame having one or more laterally adjustable elongate substantially vertical cooling fluid discharge units for directing cooling fluid toward the vertical axis of the blowing frame, together with means movable axially of the frame for engaging a glass article to be tempered at a level below the frame and for moving such article vertically to a cooling position within the confines of the blowing frame.

Other objects and advantages of the invention will hereinafter be pointed out or will become apparent from the following description of a practical embodiment of such invention, as illustrated in the accompanying drawing, in which:

Figure 1 is a view, mainly in vertical section, substantially along the line 1—1 of Fig. 2, with portions shown in elevation, of a novel rotary blowing frame together with associate supporting structure and means for engaging and moving a bottle or similar glass article from a lower level to a cooling position within the frame, the view also showing an internal cooling fluid discharge nozzle in operative position within the article to be tempered;

Fig. 2 is a horizontal section through the structure shown in Fig. 1, substantially along the line 2—2 of Fig. 1;

Fig. 3 is a similar view but at a lower level, as at the plane indicated by section line 3—3 of Fig. 1;

Fig. 4 is a relatively enlarged perspective view of a lower end section of one of the elongate, substantially vertical cooling fluid discharge units of the blowing frame, the plane at which the section has been taken being indicated by the line 4—4 of Fig. 1.

A tempering apparatus of the present invention as illustrated in the drawing includes a blowing frame F comprising an upper rotary annular supporting head 10, an annular lower head 11, vertical frame members 12 in the form of rods connecting the lower head 11 with the upper head 10, and a plurality of substantially vertical elongate cooling fluid discharge units 13 mounted between the heads at angularly spaced points around the vertical axis of the blowing frame. As shown, the upper head 10 is supported anti-frictionally, as at 14 and 15, Fig. 1, in a generally cylindrical vertical bearing member 16 which is attached to and supported in a fixed position by a suitable stationary structure, indicated generally at 17 in Fig. 1.

The rotary upper head 10 may have the lower portion thereof, indicated at 10—a, formed to be of greater external size than the body 10—b of such head. As shown, this relatively large lower portion of the head 10 has for convenience of assembly been provided as a separate annular member overlapping the body 10—b and fastened to the latter, as by set screws 18.

The substantially vertical elongate cooling fluid discharge units 13, of which three are shown in the drawing, are substantially alike so that the following description of one of them will suffice for all. This cooling fluid discharge unit comprises a substantially straight vertically disposed pipe 13—a connected at its upper end by a coupling 19 with the vertical leg of an elbow 20. The horizontal leg of the elbow 20 is connected with the horizontal leg of a second elbow 21 which has its vertical leg screwed into a threaded lower end portion 22 of a fluid conducting passage 23 in the upper head 10. The vertical pipe 13—a is closed at its lower end by an upstanding pivot plug 24 on one end portion of a horizontal adjusting plate 25 which is supported upon and pivotally attached adjacent to its other end, as at 26, Fig. 3, to the lower head 11. The pivot plug 24 is axially aligned with the coupling 19 at the upper end of the pipe 13—a while the pivot member connecting the adjusting plate 25 with the lower head 11 at 26 is axially aligned with the vertical leg of the elbow 21 at its place of attachment to the upper head 10. Thus, the adjusting plate 25 may be swung horizontally about the axis of its pivotal connection with the lower head 11 toward or away from the vertical axis of the blowing frame to adjust the radial distance of the pipe 13—a from such axis, the threaded connection at 22 between the elbow 21 and the upper head 10 permitting such movement. If desired, a suitable union or other pipe fitting may be included in the vertical leg of the elbow 21 to permit this lateral bodily movement of the pipe 13—a by the adjusting plate 25 without causing any movement of the part of the elbow 21 that is in threaded engagement with the upper head 10. This is a structural detail which readily can be provided, if desired.

The adjusting plate may include a laterally extending portion 25—a provided with an arcuate slot 27 through which extends the shank of a cap bolt 28 which is screwed into the lower head. When the cap bolt 28 has been tightened against the plate 25, the latter will be clamped to the lower head 11 to maintain the pipe 13—a in any of the various positions to which it may have been adjusted.

The pipe 13—a of each of the cooling fluid discharge units 13 may be laterally enlarged or embossed at the inner side thereof, as indicated at 29, and may be provided with a longitudinally extending slot 30 in this laterally enlarged portion. This slot may extend for the entire or any desired part of the length of the pipe 13—a and may be continuous for its full length or be interrupted at spaced places along its length by webs or cross members 30—a, Fig. 1. The laterally enlarged portion 29 of the pipe 13—a may be formed to have substantially flat faces at the sides of the slot 30. Pairs of vertically disposed laterally adjustable discharge regulating strips respectively indicated at 31, 32, 33, 34, 35 and 36 are secured to the laterally enlarged portion 29 on the pipe 13—a against the flat outer faces at opposite sides of the slot 30, as by cap bolts 37 extending through laterally enlarged openings or lateral slots 38 in such strips into the laterally enlarged portion 29 of the pipe 13—a. It will be understood that by adjusting the component members of each of these pairs of strips toward or away from each other on the outer face of the enlarged portion 29 of the pipe 13—a, the effective width of the outlet end of the discharge slot 30 can be adjusted from zero to the full width of such slot. The respective members of each pair of discharge regulating strips can of course be adjusted independently of the other pairs of strips. The adjacent side edges of the strips of each pair may be parallel with each other and with the sides of the adjacent portion of the slot 30 (as shown for the pairs of strips 31—35, inclusive, Fig. 1), or be formed to be upwardly or downwardly convergent or to cooperate with each other to make the outlet end of the slot 30 or a portion thereof of any predetermined configuration that will be useful in the service for which the blowing frame is intended.

Thus, the discharge regulating strips 36—36 which control lateral discharge of fluid from a portion of the pipe 13—a that is located below the level of a bottle 39 that is supported (in a manner hereinafter described) within the blowing frame are shown as having their adjacent edge portions formed to be different from those of the other strips. The strips 36 are formed at their adjacent portions to define between them a plurality of upwardly inclined vertical discharge apertures 40 for discharging jets of cooling fluid against the lower corner portion and the bottom surface of the bottle 39 at desired angles of incidence to such surfaces, as shown by the arrows 41 in Fig. 1. As shown in detail in Fig. 4, these inclined discharge apertures 40 are defined by providing the respective strips 36 with laterally extending mating or interengaging tongues or projections 36a at their adjacent edge portions. The effective size of these inclined discharge apertures 40 can be varied by relative lateral adjustment of the strips 36, as in the case of the other strips.

The pipe 13—a can be turned about its vertical axis to adjust the direction of the streams or jets of cooling fluid discharged therefrom toward the bottle within the blowing frame, this adjustment being independent of and available to compensate for lateral bodily adjustments of such pipe toward or away from such bottle.

The passages 23 communicate with a peripheral groove 42 in the body of the head 10. This groove in turn communicates with a passage 43 in bearing member 16. A suitable cooling fluid under pressure, such as air, steam or vapor, may be supplied to the passage 43 from any suitable source of supply through a pipe 44. If the cooling fluid employed includes moisture, it may be desirable to drain from the structure any condensation or moisture passing into and through the bearings or between other relatively moving parts. Thus, the lower portion of the bearing member 16 may be provided with an internal moisture collecting groove 45 from which moisture may pass through a passage 46 to a drain pipe 47.

The aforesaid peripheral groove 42 may communicate at suitable places around such groove with passages, such as that indicated at 48 in Fig. 1. These passages open through the bottom of the head 10. A suitable pipe fitting, such as that indicated at 49, may be threadedly engaged with the lower end portion of the walls of each passage 48 and may be connected with a laterally extending hollow head 50 so as to support the latter. The head 50 communicates at its interior with a depending hollow nozzle 51 which is closed at its lower end and is provided at its inner side with spaced orifices or jet holes 52 for discharging jets of the cooling fluid radially inward toward the neck finish portion 39—a of the bottle 39. The head 50 may serve also as a valve casing within which is disposed a needle valve 53 for controlling the flow of cooling fluid to the nozzle 51. The volume of cooling fluid passing through the nozzle 51 and directed by it against the neck finish portion of the bottle 39 thus may be adjusted from zero to substantially full volume capacity of the internal passage through the member 50. As shown in Fig. 2, there are three of these auxiliary or secondary blowing units, for blowing cooling fluid onto the neck finish portion of the bottle within the blowing frame. They are shown as being spaced equidistant around the axis of the blowing frame and respectively alternating with the elongate vertical fluid discharge or main blowing units 13.

The distance of each of the nozzles 51 from the bottle can be adjusted within limits by swinging the head 50 around the axis of the pipe fitting 49. The connection of the nozzle 51 with the head 50 permits a compensatory rotary adjustment of the nozzle 51 about its own axis so that the jet holes 52 will be turned toward the axis of the blowing frame at any position relative to the bottle to which such nozzle has been moved. The independent rotary adjustment of the nozzle 51 about its own axis may be employed to vary the angle at which the jets of cooling fluid will strike the bottle.

It may be desirable to pick up an article of glassware, such as the bottle 39, when the article is at a level below the blowing frame, as on a stationary dead plate (not shown) to which the article has been transferred from the machine by which such article was formed or from the interior of heating oven (not shown) or other suitable device for bringing the article to a proper temperature for the tempering operation. The article engaging and pick-up means shown in the drawing comprises a tongs head 54, carried by vertically movable tubular rods 55 which depend through the open central bore 56 of the upper head 10. The tongs head 54 carries a plurality of cooperative depending pivoted tong fingers 57, each of which is provided with an article engaging member 58. As shown, the member 58 is a pointed screw which is adjustably supported by the lower portion of a tong finger 57 and adapted to contact at its point with the external surface of the neck finish portion of the bottle 39 beneath the external bead thereon when the tong finger is in an appropriate position.

Means for opening and closing the tongs to grip and to release the article of glassware at the proper times may comprise a vertically movable plate 59 carried by vertically movable rods 60 which extend through and are guided by the tubular members 55 by which the tongs head 54 is supported. Pivoted links 61 connect the plate 59 with the tong fingers 57 at places which are located inwardly from the places of pivotal connections of these fingers with the head 54. Vertical movement of the plate 59 in an upward direction relative to the head 54 will cause inward swinging movements of the lower ends of the tong fingers, as to closed or article gripping positions, as shown in Fig. 1. Downward movement of the plate 59 relative to the head 54 will of course open the tongs.

The mechanism just described for gripping and releasing the article to be tempered at the proper times and for moving such article (when supported by the tong fingers) between a lower pick-up position, such, for example, as that indicated by the broken lines in the lower part of Fig. 1, and a cooling position within the blowing frame may be operated manually or by any suitable supporting and operating mechanism, provision of which is within the skill of workers in the art to which the present invention pertains.

Blowing of a cooling fluid against the external surface of the article at the cooling position by blowing means substantially as herein described may be initiated and continued as required to effect the desired cooling of the article externally. Cooling of the internal surface thereof may be effected, in conjunction with the external cooling, as by the use of a suitable internal nozzle 62 which may depend through suitable openings in the plate 59 and the tongs head 54 into the article. The internal nozzle may be supported and supplied with cooling fluid by any suitable known means, none being shown. Also, it will be understood that the cooling fluid discharge features of the nozzle 62 may be such as to effect suitable cooling of the bottle or other article of glassware at the interior thereof according to any predetermined pattern or plan.

During the blowing of cooling fluid against the external surface of the bottle, the blowing frame may be rotated about its axis. To effect such rotation, any suitable means may be employed. As shown, an annular gear or pinion 63 is secured to the head 10, as by fastening devices such as represented by the screw 64, so that the gear is axially aligned with the head. Rotation of such gear will cause rotation of the head 10 and the parts carried by the latter, including the blowing frame, as a unit. It of course will be understood that a suitable driving gear, represented by that partially shown at 63—a, Fig. 1, may be provided in mesh with the gear 63.

Various modifications of and changes in the illustrative structure shown in the drawing and herein specifically described will readily occur to those skilled in the art and I therefore do not wish to be limited to the details of such structure.

What I claim is:

1. In apparatus for applying a cooling fluid to a bottle or other glass container, an elongate tubular blowing member open at one end to receive a cooling fluid under pressure and closed at its opposite end, said tubular blowing member having an elongate slot in one side thereof, means controlling discharge of fluid from part of said slot to direct the fluid discharging therefrom in a direction extending at approximately a right angle with the longitudinal axis of the tubular blowing member, and means for controlling discharge of fluid from another part of said slot to direct the fluid discharging therefrom in a direction oblique to the longitudinal axis of the tubular blowing member.

2. In apparatus for applying a cooling fluid to a bottle or other glass container, an elongate tubular blowing member open at one end for the reception of a cooling fluid under pressure and closed at its opposite end, said tubular blowing member having a slot in one side thereof extending longitudinally of said member for a substantial part of its length, strips adjustably secured to said tubular member to project over said slot from opposite sides thereof for part of the length of the slot to define a fluid discharge outlet of regulable width for the discharge of fluid from that part of said slot, and other strips adjustably secured to said tubular member to project over the remaining part of said slot from opposite sides thereof, said last-named strips having inter-engaging edge portions constructed and arranged to define discharge apertures extending in directions oblique to the longitudinal axis of said tubular blowing member.

3. In apparatus for applying a cooling fluid under pressure to a bottle or other glass container, an elongate substantially straight tubular blowing member closed at one of its ends, means connected with said tubular member at its opposite end for supporting the tubular member in a substantially vertical position and for supplying a cooling fluid under pressure thereto, said tubular member having a longitudinally extending slot in one side thereof for the escape of fluid under pressure from the interior of said tubular member, pairs of longitudinally extending strips secured to said tubular member for controlling discharge of said fluid from different portions of said slot, the individual strips of each pair being located at opposite sides of the slot and each being laterally adjustable relative to the tubular member to project more or less over the slot from its own side thereof, the strips of one of said pairs having inter-engaging portions at their adjacent edges cooperating to define inclined discharge apertures effective to direct part of the fluid discharging from said tubular member in jets or streams moving in an inclined direction with relation to the longitudinal axis of the tubular member.

4. In apparatus for applying cooling fluid to a bottle or other glass container, the combination with means for suspending such a container in an upright position of an elongate substantially straight tubular blowing member closed at one of its ends, said tubular member having a longitudinally extending slot in one side thereof, means connected with the tubular member at its opposite end for supporting said tubular member in substantially vertical position in spaced adjacent relation to said glass container with the side of the tubular member containing said slot turned toward said container and with the closed end of said tubular member lowermost and for conducting fluid under pressure to the interior of said tubular member, means for regulating discharge of part of the fluid passing through said slot to direct such fluid horizontally against a side wall of said glass container and means for controlling discharge of another part of the fluid passing through another portion of said slot to direct the latter fluid in inclined streams against the bottom of said container.

5. In apparatus for applying cooling fluid to a bottle or other glass container, the combination with means for suspending such a container in an upright position of an elongate tubular blowing member closed at one of its ends, said tubular member having a longitudinally extending slot in one side thereof, means for supporting said tubular member in substantially vertical position, with its closed end downward, for rotation around said glass container in spaced adjacent relation thereto and with the side of the tubular member containing such slot turned toward said container, said last-named means being constructed and arranged to supply fluid under pressure to the interior of said tubular member, means for regulating discharge of fluid under pressure through one portion of said slot to direct said fluid horizontally against a side wall of said glass container, and means for controlling discharge of fluid under pressure through another portion of said slot to direct the latter fluid in inclined streams against the bottom of said container.

6. In apparatus for applying cooling fluid to a bottle or other glass container, the combination with means for suspending such a container in an upright position of an elongate tubular blowing member closed at one of its ends, said tubular member having a longitudinally extending slot in one side thereof, means for supporting said tubular member in substantially vertical position, with its closed end downward, for rotation around said glass container in spaced adjacent relation thereto and with the side of the tubular member containing said slot toward said container, said last-named means being constructed and arranged to supply fluid under pressure to the interior of said tubular member, means for regulating discharge of fluid under pressure through one portion of said slot to direct said fluid horizontally against a side wall of the container, means for controlling discharge of fluid through another portion of said slot to direct the latter fluid in inclined streams against the bottom of said container, an auxiliary blowing member carried by said means for supporting said first named blowing member and rotatable with the latter, said auxiliary blowing member being constructed and arranged to direct a cooling fluid against the exterior of the upper end portion only of said suspended glass container and the means for supporting the auxiliary blowing member being constructed and arranged to supply said cooling fluid thereto.

7. In apparatus for applying a cooling fluid to a glass bottle or other glass container, a blowing frame comprising an annular upper head, means for supporting said head with its axis vertical and for rotation about said axis, a plurality of elongate tubular blowing units carried by and depending from said head, said blowing units being arranged in an approximate circle concentric with said head, said blowing units being closed at their lower ends, said head having passages formed therein communicating with the interiors of said tubular blowing units and the means for supporting the head being constructed and arranged to supply fluid under pressure to said passages, said tubular blowing units also having lateral discharge apertures in their sides next to the axis of rotation of said head for discharging fluid under pressure from their interiors toward said axis, and means depending through said annular head for suspending a bottle or other glass container within the area bounded by said tubular blowing units in position to be bathed in cooling fluid from said blowing units.

8. In apparatus for applying a cooling fluid to a glass bottle or other glass container, a blowing frame comprising an annular upper head, means for supporting said head with its axis vertical and for rotation about said axis, a plurality of elongate tubular blowing units carried by and depending from said head, said blowing units being arranged in an approximate circle concentric with said head, said blowing units being closed at their lower ends, said head having passages formed therein communicating with the interiors of said tubular blowing units and the means for supporting said head being constructed and arranged to supply fluid under pressure to said passages, said tubular blowing units also having lateral discharge apertures in their sides next to the axis of rotation of said head for discharging fluid under pressure from their interiors toward said axis, means for suspending a bottle or other glass container in an upright position within the area bounded by said tubular blowing units in position to be bathed in cooling fluid from said blowing units, and auxiliary relatively short blowing units carried by and depending from said head in spaced relation with the suspended glass container, said last named blowing units being constructed and arranged to discharge cooling fluid under pressure onto the exterior of the upper portion only of said suspended glass container, said head and said means for supporting it being constructed and arranged to supply said cooling fluid to said auxiliary blowing units.

9. In apparatus for applying a cooling fluid to a glass bottle or other glass container, a blowing frame comprising an annular upper head, means for supporting said head with its axis vertical and for rotation about said axis, a plurality of elongate tubular blowing units carried by and depending from said head, said blowing units being arranged in an approximate circle concentric with said head, said blowing units being closed at their lower ends, said head having passages formed therein communicating with the interiors of said tubular blowing units and the means for supporting said head being constructed and arranged to supply fluid under pressure to said passages, said tubular blowing units also having lateral discharge apertures in their sides next to the axis of rotation of said head for discharging fluid under pressure from their interiors toward said axis, means for suspending a bottle or other glass container in an upright position within the area bounded by said tubular blowing units in position to be bathed in cooling fluid from said blowing units, auxiliary relatively short blowing units carried by and depending from said head in spaced relation with the suspended glass container, said last named blowing units being constructed and arranged to discharge cooling fluid under pressure onto the exterior of the upper portion only of said suspended glass container, said head and said means for supporting it being constructed and arranged to supply said cooling fluid to said auxiliary blowing units, means for regulating discharge through said first named blowing units variably at different places along their length, and means for regulably controlling discharge of cooling fluid from said second named blowing units.

10. In apparatus for applying a cooling fluid to a bottle or similar glass article, a rotary blowing frame comprising a rotary substantially horizontal annular upper head, an annular lower head, a plurality of elongate blowing units having lateral discharge outlets, means connecting the opposite ends of said elongate units with said heads so that said units are spaced angularly around the axis of the frame with their lateral discharge outlets turned toward said axis and so that each blowing unit is independently adjustable bodily toward and from said axis, and means for gripping a bottle or similar article externally at its neck portion and for suspending said article within the confines of said blowing frame in position to be cooled at its exterior by cooling fluid from said blowing units.

11. In apparatus for applying a cooling fluid to a bottle or similar glass article, a rotary blowing frame comprising a rotary substantially horizontal annular upper head, an annular lower head, a plurality of elongate blowing units having lateral discharge outlets, means connecting the opposite ends of said elongate blowing units with said heads so that said units are spaced angularly around the axis of the frame with their lateral discharge outlets turned toward said axis and so that each blowing unit is independently adjustable bodily toward and from said axis, means for gripping a bottle or similar article externally at its neck portion and for suspending said article within the confines of said blowing frame in position to be cooled at its exterior by cooling fluid from said blowing units, said means for gripping and suspending said glass article being movable axially of said frame to move said article bodily between a position completely below said frame upwardly through said lower head to said position within the confines of said frame.

12. In apparatus for applying a cooling fluid to a glass bottle or other glass container, a rotary blowing frame comprising an annular upper head, means for supporting said head with its axis vertical and for rotation about said axis, a plurality of elongate tubular blowing units carried by and depending from said head, said blowing units being arranged in an approximate circle concentric with said head, said blowing units being closed at their lower ends, said head having passages formed therein communicating with the interiors of said tubular blowing units and the means for supporting said head being constructed and arranged to supply fluid under pressure to said passages, said tubular blowing units also having lateral discharge apertures in their sides next to the axis of rotation of said head for discharging fluid under pressure from their interiors toward said axis, means for suspending a bottle or other glass container in an upright position within the area bounded by said tubular blowing units in position to receive cooling fluid from said blowing units, auxiliary relatively short blowing units, and means connecting said auxiliary blowing units with said head so that they depend therefrom in spaced relation with the suspended glass container and each auxiliary blowing unit is independently rotatable about its own vertical axis, said last named blowing units being constructed and arranged to discharge cooling fluid under pressure onto the exterior of the upper portion only of said suspended glass container, said head and said means for supporting it being constructed and arranged to supply said cooling fluid to said auxiliary blowing units.

13. In apparatus for applying cooling fluid to a bottle or similar glass article, a blowing frame comprising vertically spaced substantially horizontal upper and lower annular heads and vertical rods connecting said heads to each other, a plurality of substantially vertical elongate tubular blowing units having lateral discharge outlets, and adjusting means movably connecting said blowing units with said heads to position the blowing units in angularly spaced relation around the axis of said frame and so that each of said blowing units is adjustable bodily relatively to the axis of said frame and adjustable rotatably about its own axis.

14. In apparatus for applying cooling fluid to a bottle or similar glass article, a blowing frame comprising vertically spaced substantially horizontal upper and lower annular heads and vertical rods connecting said heads to each other, a plurality of substantially vertical elongate tubular blowing units, adjusting means movably connecting said blowing units with said heads to position the blowing units in angularly spaced relation around the axis of said frame and so that each of said blowing units is adjustable bodily relatively to the axis of said frame and adjustable rotatably about its own axis, each of said blowing units having a longitudinally extending slot in its side that is turned toward the axis of the frame, means depending through said upper head for suspending a bottle or similar glass article within the confines of said blowing frame and substantially concentric therewith, and means carried by said tubular blowing units for variably adjusting the discharge of cooling fluid through different portions of said slots to direct narrow vertical sheets of cooling fluid in a substantially horizontal direction against the exterior of the side walls of said glass article and inclined jets of cooling fluid against the lower corner and bottom portions of said article.

CHARLES E. MONGAN, Jr.